United States Patent

[11] 3,598,263

| [72] | Inventor | Robert J. Ehmke<br>3307 N. 84th St., Milwaukee, Wis. 53122 |
|---|---|---|
| [21] | Appl. No. | 790,007 |
| [22] | Filed | Jan. 9, 1969 |
| [45] | Patented | Aug. 10, 1971 |

[54] PLATE GLASS HANDLING DEVICE
6 Claims, 5 Drawing Figs.

[52] U.S. Cl. .................................................. 214/652,
214/147, 214/620
[51] Int. Cl. .................................................. B66c 1/02
[50] Field of Search .................................................. 214/650,
651, 652, 620, 650 SG, 730, 1 BS, 147, 1 CM, 1 SW

[56] References Cited
UNITED STATES PATENTS

| 2,959,301 | 11/1960 | Willsea | 214/1 (CM) |
| 3,043,448 | 7/1962 | Melton | 214/1 (CM) |
| 3,047,167 | 7/1963 | Rose | 214/1 (CM) |

FOREIGN PATENTS

| 859,162 | 1/1961 | Great Britain | 214/1 (CM) |

Primary Examiner—Robert G. Sheridan
Assistant Examiner—George F. Abraham
Attorney—Donald E. Porter ABSTRACT: A handling apparatus for lifting, transporting, tilting and positioning heavy workpieces, such as plate glass, or other large, cumbersome objects which require accurate placement and smooth, precision handling. The apparatus includes a lift vehicle having an elevatable member on which are mounted a plurality of hydraulically controlled interacting, extendible struts for positioning a workpiece holding frame, whereby the apparatus can be controlled by a single operator.

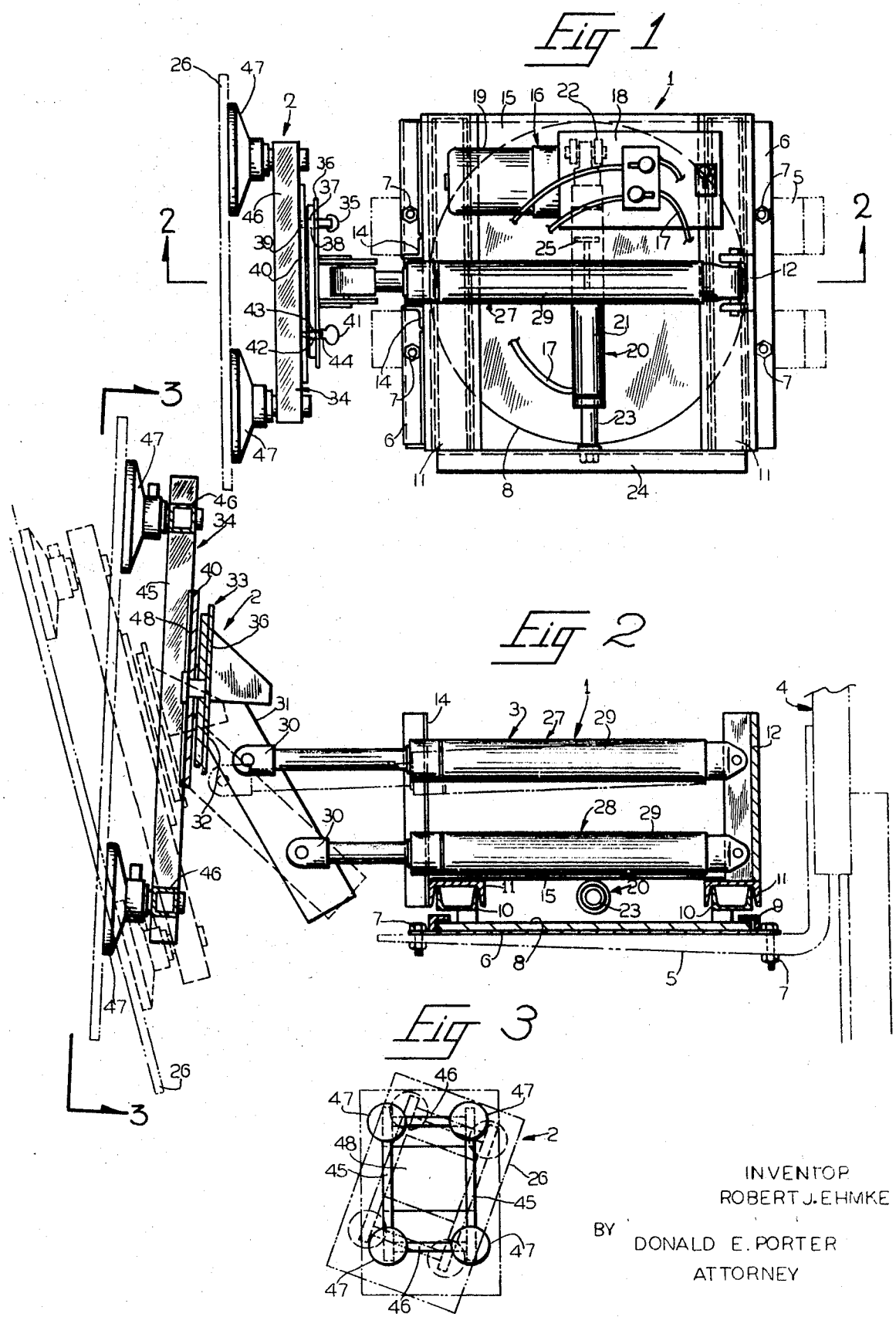

INVENTOR
ROBERT JEHMKE
BY
DONALD E. PORTER
ATTORNEY

PLATE GLASS HANDLING DEVICE

This invention provides a mechanical handling device for large workpieces such as sheets of plate glass, which must be accurately positioned. In the case of plate glass to be installed in window openings, either in new buildings, or to replace broken windows in old buildings, the apparatus greatly simplifies the handling procedure and makes it possible for a single operator to do the job. The apparatus includes a lifting vehicle, such as a fork lift truck, on which is mounted a turntable connected to an articulated, relatively movable plate glass supporting frame. The various parts of the frame can be actuated independently or together to lift a plate glass workpiece vertically, move it laterally, move it toward or away from the lifting vehicle, rotate the workpiece about either a horizontal or a vertical axis, and any combination of these movements. As presently contemplated, the articulated parts of the workpiece supporting frame are hydraulically actuated by means of extendible hydraulic cylinder assemblies interconnecting various parts of the frame. The lateral movement is accomplished by a laterally slidable carriage disposed on tracks on the turntable and supporting the remainder of the frame. An hydraulic cylinder assembly causes the carriage to slide laterally on the tracks to position the workpiece in the proper location.

BACKGROUND OF THE INVENTION

Plate glass handling is delicate by nature because of the low tolerance of large plate glass to impacts and bending. For this reason, large crews have been required to handle and install large plate glass windows so popular in modern buildings. The main expense entailed in such window installations is the labor involved, and for this reason, architects and building designers sometimes avoid the use of large glass windows which would be esthetically pleasing and supplement the heating system in the winter through added heat from sunlight. The handling crews are required to maneuver the large, heavy glass sheets into place without excessive bending and consequent breakage. Manual handling has limitations as to the minimum space which can be negotiated by the handling crew.

This invention greatly simplifies the plate glass handling procedure, eliminates the requirement for a handling crew, and thereby substantially reduces the cost of glass window installation. The handling apparatus of the invention can be controlled by a single operator completely, from the time the glass is lifted until the finished installation is completed.

SUMMARY OF THE INVENTION

In general, the apparatus comprises a workpiece holding assembly, a movable positioning assembly, and a mobile transporting vehicle for carrying the assemblies to and from the installation area. The plate glass holding assembly includes vacuum suction means for attaching directly to the side surface of the glass. The suction devices are spaced around an adjustable frame to balance the stresses as the glass is lifted. Additional, auxiliary frame elements and suction holding devices can be added to supplement the support for larger glass plates. The positioning assembly as presently contemplated is hydraulically operated, and positions the holding assembly accurately and smoothly to facilitate automated handling and window installation of large sheets of plate glass. The apparatus can, of course, be adapted to handle other workpieces, even of various shapes. In some instances, other workpiece gripping means are substituted for the vacuum suction means.

BRIEF DESCRIPTION OF THE DRAWING

FIG. 1 of the drawings is a top plan view with parts broken away and some parts shown in phantom of the apparatus of the invention;

FIG. 2 is a side view partially in section taken generally on lines 2–2 of FIG. 1;

FIG. 3 is a reduced front plan view with some parts shown in phantom taken generally along line 3–3 of FIG. 2;

DESCRIPTION OF THE PREFERRED EMBODIMENT

Figure 4:
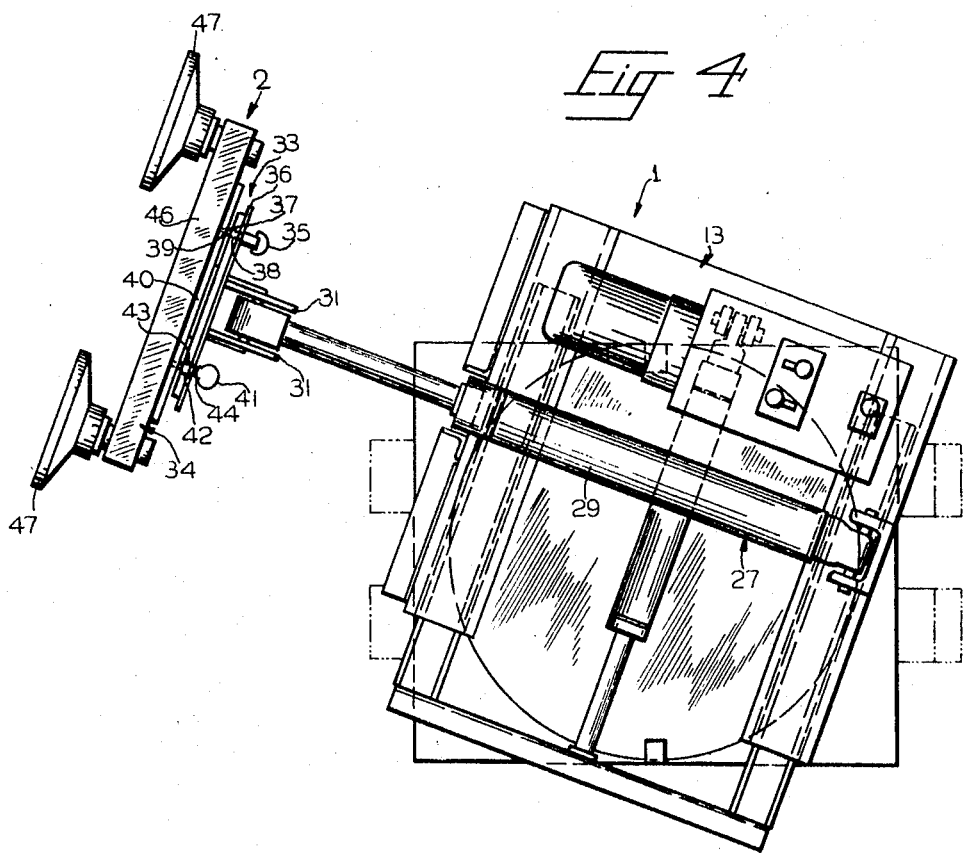
FIG. 4 is a top plan view similar to FIG. 1 showing the positioning assembly rotated with the plate glass holding assembly in the extended position.

As shown in the drawings, a plate glass handling apparatus 1 includes a plate glass holding assembly 2, a movable positioning assembly 3, and a mobile transporting vehicle 4. Only a small portion of the vehicle 4 is shown, because it is a conventional lift truck, including a pair of lift forks 5. The lift forks 5 provide a vertically positionable support to which the movable positioning assembly 3 is attached.

The positioning assembly 3 includes a main horizontal platform 6, which is secured to the lift forks 5 by means of bolt assemblies 7. The platform 6 provides a support means for a turntable 8. The platform 6 includes a circular guide 9 for slidably retaining the turntable 8 on the platform 6.

The turntable 8 has a pair of linear parallel, horizontal rails 10 attached thereto, on which ride a pair of complementary, linear, U-shaped slide members 11. A U-shaped vertical stanchion 12 extends upwardly from the middle portion of the rear slide member 11.

The slide members 11 form the base of a slidable carriage frame a13 which includes, in addition to the vertical stanchion 12, a pair of front, vertical guide struts 14 extending upwardly from the middle portion of the front slide member 11, and a horizontal cross frame member 15, which extends transversely between the corresponding ends of the slide members 11, and is secured thereto.

The cross frame member 15 provides support for the hydraulic pump assembly 16 disposed thereon. The hydraulic pump assembly 16 includes a plurality of fluid conduits 17 which emanate from a common hydraulic fluid pressure chamber 18 connected to a hydraulic pump motor 19.

A transverse motion, double-acting hydraulic cylinder assembly 20 is disposed midway between the slide members 11, in the same horizontal plane and parallel thereto. The assembly 20 includes a cylinder 21 pivotally secured to the horizontal cross frame member 15 on downwardly extending brackets 22 shown in phantom in FIG. 1. A piston rod 23 extends from the other end of the cylinder 21, and is connected at its end to a horizontal transverse bar 24 which extends between, and connects to, the corresponding ends of the rails 10. Thus it can be seen that extension and retraction of the piston rod 23 out of, and back into, the cylinder 21 by controlling the hydraulic pressure acting against the opposite sides of a piston 25 connected to the piston rod 23 will cause the slidable carriage frame 13 and the plate glass holding assembly 2 to move parallel to the generally vertical plane of a plate glass workpiece 26 carried thereon.

The plate glass holding assembly 2 is supported by means of upper and lower double acting hydraulic cylinder assemblies 27 and 28 disposed generally perpendicular to the cylinder assembly 20. Each cylinder assembly 27 and 28 includes a cylinder 29 connected to the U-shaped vertical stanchion 12, one above the other, and each having a piston rod end 30 pivotally connected one above the other to the plate glass holding assembly 2. As described above in connection with the cylinder assembly 20, the piston rod end 30 can be extended or retracted to control the attitude of the plate glass workpiece 26. The cylinder assemblies 27 and 28 can be operated independently so that the upper piston rod 23 is retracting while the other is extending. This independent motion provides a modified parallelogram effect to control the position of the workpiece 26. The vertical guide struts 14 provide lateral restriction for the cylinder assemblies 27 and 28, but do not restrict their respective vertical movement. It is possible to selectively raise and lower the workpiece 26 over a smaller range than that provided by forks 4, and to rotate its attitude with reference to the vertical by coordinated operation of the cylinder assemblies 27 and 28

The plate glass holding assembly 2 includes a pair of parallel beams 31 having upper ends 32 cut at a 45° angle. The ends 32 are welded to a small turntable assembly 33. A rectangular support frame 34 is rotatable attached to the turntable assembly 33, and the support frame 34 can be rotated 360° relative to the parallel beams 31.

As best seen in FIG. 1, a pin lock 35 is provided which is mounted on nonrotating plate 36 of the turntable assembly 33. An opening 37 is provided through the plate 36, and shank 38 of the pin lock 35 is biased to extend through the opening 37 to engage and lock in any one of a plurality of recesses 39 disposed around the periphery of a rotatable turntable 40. An intermediate position lock 411 is also provided, mounted on the nonrotating plate 36. The lock 41 has a threaded shank 42 extending through a threaded opening 43. Handle 44 can be rotated to urge the inner end of the shank 42 into holding engagement with the rotatable turntable 40. The lock 41 allows infinite angular position fixing of the rotatable turntable 40 in addition to the specific pin locked angular positions provided by the pin lock 35.

The rectangular support frame 34 is connected to the rotatable turntable 40 and rotates with it, as shown in FIG. 3. The frame 34 comprises at least a pair of parallel side struts 45 and a pair of right angle, interconnecting struts 46. Four or more vacuum suction cups 47 are mounted on the frame 34 for engaging and gripping the plate glass workpiece 26. A reinforcing plate 48 extends between the side struts 45 intermediate their ends, and connects the frame 34 to the turntable 40. For handling larger plate glass workpieces 26, it is contemplated that additional frame elements (not shown) can be added to the frame 34 with additional suction cups 47 to additionally stabilize the workpiece 26 to prevent bending stresses and resulting glass breakage.

Figure 5:
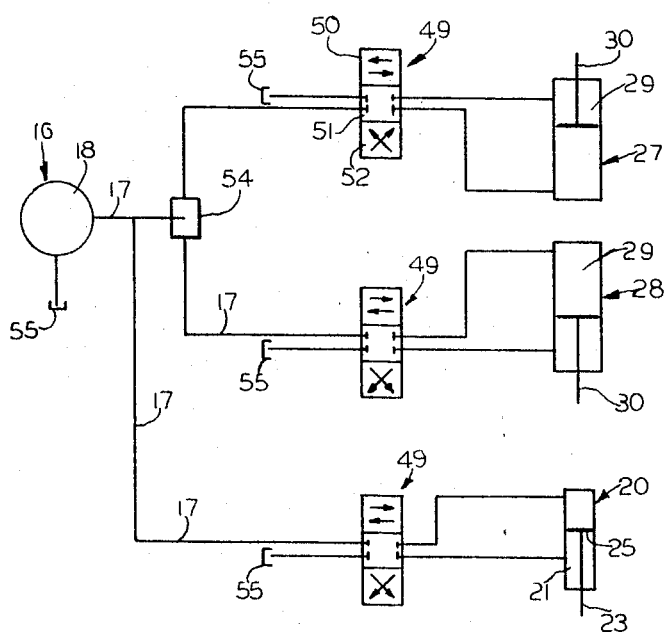
FIG. 5 is a schematic representation of the hydraulic control system for operating the positioning assembly.

The hydraulic pump assembly 16, fluid conduits 17, the hydraulic cylinder assemblies 20, 27 and 28 and their related parts are shown schematically in FIG. 5 of the drawings. Three position hydraulic valve control means 49 are also shown schematically in FIG. 5 for each of the cylinder assemblies 20, 27 and 28. As shown there, each valve control means 49 has a push position, a neutral position, and a return flow position as indicated by the blocks 50, 51 and 52 in FIG. 5. All of the valve and cylinder assemblies are supplied with hydraulic fluid under pressure by the pump motor 19. The hydraulic cylinder assemblies 27 and 28 are supplied through a manifold 54, and a common hydraulic fluid reservoir 55 which, for illustration purposes, is indicated relative to each valve control means 49 in FIG. 5.

As can be seen, each piston rod 23 will be pushed towards its fully extended position when its corresponding valve control means 49 is in the push position 50. No movement will ordinarily occur when the control means 49 is in the neutral position 511, and placing control means 49 in the return position 53 will cause the piston rod 23 to retract back into its cylinder 21. By utilizing the manifold 54, it is possible to operate the hydraulic cylinder assemblies 20, 27, and 28 independently. For example, the upper cylinder assembly 27 can be operated by its control means 49 to retract the piston rod 23 while the lower cylinder assembly 28 is operated in any of its three positions. This is also true for the transverse motion hydraulic cylinder assembly 20. Thus it can be seen that an infinite degree of hydraulic control is possible to replace all the manual positioning motions previously necessary in large plate glass handling.

I claim:

1. Apparatus for handling a flat sheetlike generally vertical workpiece comprising, in combination:
   a. support means for attachment to the workpiece,
   b. first rotatable means mounting said support means for rotation thereof and of the workpiece in its own plane about a generally horizontal axis perpendicular to the plane of the workpiece,
   c. maneuvering means connected to said support means for selectively moving said support means and a workpiece vertically and pivotally; said maneuvering means including a frame having a pair of vertically spaced selectively extendable and retractable parallel hydraulic piston and cylinder members, each piston and cylinder member being pivotally connected at one and to the frame and at its opposite end to the support means, said members being actuatable simultaneously or separately,
   d. second rotatable means mounting said maneuvering means for rotation about a generally vertical axis,
   e. and means for moving said maneuvering means relative to said second rotatable means and generally parallel to the plane of the workpiece.

2. The apparatus of claim 1 in which said first rotatable means comprises turntable means interconnecting said support means with said maneuvering means.

3. The apparatus of claim 2 which includes stop means for locking said turntable means at any angular position thereof.

4. The apparatus of claim 1 which includes linear guide rail means fixed to said second rotatable means, and linear slide means mounted on said guide rail means for movement therealong, and in which said moving means (e) comprises an extendable-retractable member interconnecting said guide rail means and slide means.

5. The apparatus of claim 1 which includes a generally horizontal platform; and in which said second rotatable means comprises turntable means interconnecting said platform with said maneuvering means.

6. The apparatus of claim 1 which includes means for vertically moving said support means and the workpiece over a larger range of elevations than that provided by said maneuvering means.